United States Patent Office 3,296,291
Patented Jan. 3, 1967

---

3,296,291
REACTION OF SILANES WITH UNSATURATED OLEFINIC COMPOUNDS
Alan J. Chalk, Scotia, and John F. Harrod, Ballston Lake, N.Y., assignors to General Electric Company, a corporation of New York
No Drawing. Filed July 2, 1962, Ser. No. 207,045
14 Claims. (Cl. 260—448.2)

The present invention relates to an improved method for making organosilicon compositions. More particularly, the invention relates to the production of organosilicon compositions by effecting an addition reaction between a compound containing a silicon-bonded hydrogen atom (i.e., a silane group, $\equiv$SiH) with a compound containing aliphatic unsaturation (e.g., the ethylenic radical, $>$C$=$C$<$, and the acetylenic radical, —C$\equiv$C—) in the presence of an organic rhodium compound soluble in at least one of the aforesaid reactants whereby a carbon-silicon bond is formed between the silicon of the silane group and a carbon of the unsaturated moiety of the unsaturated organic compound.

Desirable products, prepared by the addition of compounds containing silicon-hydrogen ($\equiv$SiH) linkages with organic compounds containing aliphatic unsaturation have been disclosed in the prior art. This reaction is illustrated by the following equation employing olefinic unsaturation for illustrative purposes:

(1) 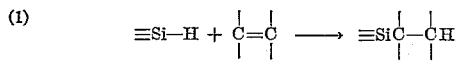

Although reactions of the above type can be carried out in the absence of catalysts, they are preferably carried out in the presence of catalysts such as organic peroxides, metals, such as palladium and platinum, and platinum-containing materials such as chloroplatinic acid. However, the use of these catalysts has been accompanied by certain disadvantages. For example, the addition in the presence of peroxide catalysts has been disadvantageous in that the yields have been generally low, and undesirable by-products have been obtained which interfere with the isolation of the desired reaction product. Metallic catalysts such as palladium or platinum have produced better results, particularly with platinum in the form of platinized charcoal. However, even with platinized charcoal the reactions have not been as rapid as desired, the yields have not been as high as desired and the presence of by-products has often presented difficulties.

While chloroplatinic acid is a generally useful catalyst for many reactions within the scope of Formula 1, chloroplatinic acid also has certain disadvantages. For example, chloroplatinic acid is not always effective at very low concentrations; its high degree of insolubility in organic materials often renders it difficult to handle; and its tendency to become poisoned by outside influences is greater than desired. Finally, chloroplatinic acid sometimes requires higher reaction temperatures than desired. Many of the disadvantages of the metal catalysts are associated with their lack of solubility in non-polar reaction media which results in limitations associated with heterogeneous reactions. Thus only the surface of an insoluble catalyst can effect reaction which makes for slower, more difficulty controllable and more easily poisoned reactions than does a comparable soluble catalyst.

The object of the present invention is to provide a rhodium catalyst soluble in reaction media of low polarity, such as olefinically unsaturated compounds and organosilicon hydrides.

A further object of the present invention is to provide an improved process for the reaction of a silicon compound containing a silicon-hydrogen linkage with a compound containing aliphatic unsaturation to provide high yields of addition products without the formation of undesirable amounts of by-products.

Another object of the invention is to carry out the addition reaction between a silicon compound containing a silicon-hydrogen grouping with a compound containing aliphatic unsaturation using less vigorous conditions and lower catalyst concentrations.

Other objects of the invention will be more apparent from the following description of our invention.

The above objects have been obtained by conducting the reaction described in Formula 1 in the presence of an organic rhodium compound soluble in one of the reactants, i.e., the silane-containing reactant or the unsaturated compound. The term "organic rhodium compound" (soluble in at least one of the reactants) is intended to mean an organic derivative of rhodium catalytically active in effecting the above-described reaction obtained by suitable reaction of rhodium trichloride trihydrate having the formula (2)   $RhCl_3 \cdot 3H_2O$ with an organic complexing agent capable of solubilizing the rhodium trichloride trihydrate (hereinafter referred to as "rhodium chloride") in the aforesaid reactants as contrasted to the rhodium chloride itself which is insoluble in the reactants. Catalyst solubility in non-polar media may be achieved by the synthesis of metal compounds containing organic groups which confer solubility in non-polar solvents. A restriction on the nature of these organic groups (or ligands) attached to the rhodium metal ion is that they should not bind the metal so strongly that catalytic interaction of the metal with the reacting substances is thereby hindered (unless reduced catalytic activity is required).

Various methods may be employed to make the rhodium compounds catalytically active for and soluble in the above-desired reactants. One method for rendering the rhodium chloride soluble is to dissolve, on a weight basis, one part o fthe rhodium chloride with at least 4 parts (e.g., 5 to 100 or more parts) of an aliphatic alcohol (saturated or unsaturated) free of tertiary carbon atoms and containing from 1 to 8 carbons. Among the alcohols which can be employed are, for instance, methyl alcohol, ethyl alcohol, propyl alcohol, isopropyl alcohol, butyl methallyl alcohol, crotyl alcohol, etc. Thereafter, the solution of the rhodium chloride in the alcohol is added to a molar excess of a silane of the formula (3)   $R_3SiH$ in a molar ratio of at least 2 mols (e.g., from 2 to 100 mols or more) of the silane per mol of alcohol in the rhodium chloride solution, where R is a monovalent hydrocarbon radical, for instance, alkyl (e.g., methyl, ethyl, propyl, isopropyl, butyl, hexyl, 2-ethylhexyl, etc.), aryl (e.g., phenyl, naphthyl, etc.), aralkyl (e.g., benzyl, phenylethyl, etc.), alkaryl (e.g., toyly, xylyl, ethylphenyl, etc.). It is important, when making the soluble rhodium compound by the above method and particularly with reference to the last step of the reaction between the rhodium chloride-alcohol solution and the aforesaid silane of Formula 3, that rhodium chloride-alcohol solution be added to the silane. If the silane is added to the rhodium chloride-alcohol solution, one will obtain precipitation of the rhodium metal and will not obtain the desired soluble organic compound of the rhodium chloride. The added silane rapidly reacts (without the need of added heating) with the active hydroxyl group of the alcohol (which is the solvent for the rhodium chloride), giving rise to a vigorous effervescence of hydrogen gas. When this effervescence has subsided the catalyst solution can then be used for the addition of the silicon hydride to the unsaturated compound without further concern for the liberation of gases, which would be detrimental in casting applications involving the aforesaid silicon hydride and olefinic reactant.

Another method for making the soluble compound of the rhodium chloride is again to dissolve the rhodium chloride in an aliphatic alcohol similarly as was done above and thereafter advantageously (though not necessarily) adding a basic material (free of complexing groups), for instance, sodium hydroxide, potassium hydroxide, sodium carbonate, etc., and an olefin which has a boiling point preferably although not necessarily around room temperature (20–30° C.) or higher, for example, ethylene, propylene, isopropylene, butylene, isobutylene, heptene-1, octene-1, etc. The reaction between the ingredients is preferably carried out under the influence of heat such as from about 50–125° C. (employing superatmospheric pressures in those instances where the olefinic compound is a gas at reaction temperature), until reaction has taken place. When using a basic material, one can employ at least one equivalent of basic material per equivalent of rhodium in the rhodium chloride solution. The amount of olefin used can be varied but advantageously is present in an amount of at least 1 mol of the latter per mol rhodium to as high as 10 to 100 mols or more of the olefin, since the olefin also serves as a solvent for the reaction products. Thereafter, by volatilizing the soluble materials in the reaction mixture such as the olefin and unreacted alcohol, the soluble rhodium compound is obtained which is soluble in both the olefinic reactant and the silane reactant. This method for making the soluble rhodium compound is based on the premise that univalent and not trivalent rhodium will form olefin compounds of rhodium. Therefore, when starting with rhodium chloride, it is necessary to reduce rhodium to the monovalent state by treating the rhodium chloride with the above-mentioned alcohol in the presence of the base. Under the above condition of reaction, one would obtain a soluble rhodium compound containing olefinic unsaturation having the formula $$H_aRh_bOlefin_cCl_d$$

where $a$ is a whole number from 0 to 1, inclusive, $b$ is a whole number from 1 to 2, inclusive, $c$ is a whole number from 1 to 4, inclusive, and $d$ is a whole number from 2 to 4, inclusive, and the word "olefin" stands for an aliphatic unsaturated hydrocarbon, e.g., ethylene, the various isomers of propene, butene, hexene, octene, etc. Examples of such rhodium compounds containing olefins are $Rh_2(C_2H_4)_4Cl_2$, $HRh(C_8H_{16})_2Cl_2$, $H_2Rh_2(C_6H_{12})_2Cl_4$, $H_2RhC_4H_8Cl_3$, etc.

A still further method for making the organic soluble rhodium compound (in the form of a rhodium carboxylate) is to effect reaction between the rhodium chloride and a water-soluble salt of an organic acid in a molar ratio of from 3 to 6 or more mols of the salt of the organic acid per mol of the rhodium chloride, advantageously employing water or an aliphatic alcohol as the medium in which the reaction is carried out. Among such salts may be mentioned the alkali-metal salts of monocarboxylic acids (both saturated and unsaturated, as well as aromatic acids), for instance, the alkali-metal salts of butyric, hexanoic, octanoic, acrylic, methacrylic, crotonic, benzoic, etc. acids. The inorganic portion of the water-soluble salt may be for instance sodium, potassium, cesium, ammonium, etc. The proportions of ingredients can be varied widely and this method yields a soluble rhodium compound with a minimum of processing. The rhodium compound precipitates from the aqueous solution if a suitable alkali-metal salt of a carboxylic acid is used. When an alcohol is used (e.g. ethanol) as the medium, the desired rhodium compound remains in solution but the ionic salt, e.g., the sodium chloride, precipitates. Although we do not wish to be bound by the theory as to the structure of this compound nevertheless it is believed when water is used as the medium, that these rhodium compounds can be assigned the empirical formula

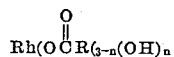

where R is a monovalent hydrocarbon radical, many examples of which have been given above for R in Formula 3, and $n$ is a value from 0 to 1, inclusive. Where the medium is an aliphatic alcohol, $n=0$ and the rhodium compound is substantially free of rhodium-bonded hydroxyl groups.

These rhodium catalysts are quite different from the $RhCl_3 \cdot 3H_2O$ starting material because the latter will not survive the reaction described above unchanged and the rhodium chloride is insoluble in many organic solvents and certainly in the silicon hydride and olefin reactants. In contrast to this the above-mentioned rhodium compounds are soluble in polar organic materials (such as the simple alcohols) and in conventional hydrocarbon solvents (such as benzene or toluene).

To give a better insight into the nature of the rhodium catalyst used in the practice of the present invention, the following is a detailed method for preparing catalysts of this type (identified as Method No. 1). More particularly, on a weight basis 5 parts $RhCl_3 \cdot 3H_2O$ was added to a mixture of 60 parts octene-1 and 16 parts ethanol. The resulting mixture was heated at the reflux temperature of the mass for one hour and then evaporated to dryness in vacuo. The residue was extracted with chloroform and the chloroform extract was evaporated at room temperature. The resulting oily liquid was extracted with n-hexane to yield 2 parts of a powder (after vacuum drying) which itself is somewhat soluble in aliphatic hydrocarbons but highly soluble in other organic solvents of higher polarity including aromatic hydrocarbons. A concentrated carbon tetrachloride solution of this soluble rhodium compound gave an infrared spectrum attributable to an olefin bound to the rhodium metal ion. The presence of more than one

stretching band in the 6.5–6.7μ region established that the octene-1 underwent extensive double bond migration under the conditions of the reaction, and the product was a mixture of isomeric octene compounds of the rhodium.

Another method for making the rhodium compound in greater detail (identified as Method No. 2) in which all parts are by weight is as follows. About 5.3 parts $RhCl_3 \cdot 3H_2O$ was dissolved in 80 parts of ethanol. Thereafter this solution was added to 400 parts triethylsilane. Hydrogen evolved rapidly from the mixture without the use of heat. The product thus obtained was a soluble rhodium compound solution useful as a catalyst for the reaction of organosilicon hydrides and olefinic compositions.

The rhodium compounds are operative for the addition of an unlimited class of silicon compounds containing a silicon-hydrogen linkage to an unlimited group of organic compounds containing a pair of aliphatic carbon atoms linked by multiple bonds, as illustrated, for example, in Formula 1.

As an illustration of the addition reactions in which the rhodium compounds are operative, reference is made to Patent 2,823,218—Speier et al. The rhodium compounds of the present invention are operative for each of the addition reactions described in the aforementioned reaction. As a further illustration of reactions in which the rhodium compounds are applicable, reference is made to Patent 2,970,150—Bailey.

The organosilicon reactant containing the silicon-hydrogen linkage can be inorganic or organic and can be monomeric or polymeric. The only requirement of the silicon-hydrogen-containing reactant is that the reactant contain at least one silicon-bonded hydrogen atom per molecule, and preferably no more than two hydrogen atoms attached to any one silicon atom.

Among the inorganic monomeric materials which contain silicon-bonded hydrogen atoms and which are useful as reactants in the process of the present invention can be mentioned, for example, trichlorosilane and dibromosilane. Among the operable polymeric inorganic materials can be mentioned pentachlorodisilane, pentachlorodisiloxane, heptachlorotrisilane, etc.

Among the monomeric silicon compounds and organosilicon compounds containing silicon-hydrogen linkages which are operable in the practice of the present invention are those having the formula:

(4) $\quad (Z)_a Si(H)_b (X)_{4-a-b}$ where X is a member selected from the class consisting of halogen, —OZ (i.e., organoxy) radicals, and —OOCZ (i.e., acyloxy) radicals, Z can be any organic radical, but preferably is a member selected from the class consisting of monovalent hydrocarbon radicals, halogenated monovalent hydrocarbon radicals and cyanoalkyl radicals, $a$ has a value of from 0 to 3, inclusive, $b$ has a value of from 1 to 2, inclusive, and the sum of $a$ plus $b$ is from 1 to 4, inclusive. Where more than one Z radical is present in a compound within the scope of Formula 4, the various Z radicals can differ from each other. Among the radicals represented by Z can be mentioned, for example, alkyl radicals, e.g., methyl, ethyl, propyl, octyl, octadecyl, etc. radicals; cycloalkyl radicals such as, for example, cyclohexyl, cycloheptyl, etc. radicals; aryl radicals, e.g., phenyl, naphthyl, tolyl, xylyl, etc. radicals; aralkyl radicals, e.g., benzyl, phenyl ethyl, etc. radicals; and haloaryl and haloalkyl radicals, e.g., chloromethyl, chlorophenyl, dibromophenyl, etc. radicals. In the preferred embodiment of our invention, the Z radical is methyl or a mixture of methyl and phenyl. In addition to the radicals mentioned above, the Z radical can also be an unsaturated aliphatic radical such as vinyl, allyl, cyclohexenyl, etc. When the Z radical is a radical with aliphatic unsaturation, it is possible to react the silicon compound containing silicon-hydrogen linkage with itself.

Among the specific type of monomeric silicon compounds and organic silicon compounds within the scope of Formula 4 are those having the formula:

$ZSiHCl_2$, $Z_2SiHCl$, $Z_3SiH$, $ZSiH_2Cl$, $Z_2SiH_2$
$HSi(OZ)_3$, $H_2Si(OZ)_2$, $ZSiH(OZ)_2$, $HSi(OOCZ)_3$
$ZSiH(OOCZ)_2$ and $SiHCl_3$ where Z is as previously defined. Specific examples are, e.g., $CH_3SiHCl_2$, $C_6H_5SiHCl_2$, $(C_2H_5)_2SiHCl$,
$(CH_3)_2SiHOCH_5$, $(C_6H_5)_2SiH_2$, $HSi(OCH_3)_3$
$HSi(OOCCH_3)$, $C_6H_5SiH(OOCC_2H_5)$, $SiH_2Cl_2$, etc.

Among the silicon-hydrogen containing compounds useful in the practice of the present invention are those in which each molecule contains more than one silicon atom. Within this category are included organopolysilanes, organopolysiloxanes and various polysilalkalene compounds containing, for example, a —SiCH₂Si— grouping or a —SiCH₂CH₂Si— grouping and polysilphenylene materials which contain the —SiC₆H₄Si— grouping and the organosilazanes which are characterized by an Si—N—Si linkage in the polymer structure. Among the structurally uncomplicated silicon-hydrogen compounds containing more than one silicon atom are materials having the formulae:

$Z_2HSiSiZ_3$, $Z_2HSiSiH_2Z$, $Z_3SiOSiHZ_2$
$ClZ_2SiOSiHCl_2$, $SiCH_2CH_2SiHZ_2$
$HZ_2SiC_6H_4SiZ_2H$, $Z_3SiO(ZHSiO)_cSiZ_3$ where Z is as previously defined and $c$ is an integer, for example, an integer equal to from 1 to 10,000 or more.

Among the organopolysiloxanes operable in the practice of the present invention are polymers and copolymers containing up to one or more of the units having the formula:

$Z_3SiO_{0.5}$, $Z_2SiO$, $ZSiO_{1.5}$ or $SiO_2$ along with at least one unit per molecule having the formula:

$ZHSiO$, $Z_2HSiO_{0.5}$, $HSiO_{1.5}$, $H_2SiO$ or $ZH_2SiO_{0.5}$ where Z is as previously defined. Among such units may be mentioned $CH_3Si_{1.5}$, $(CH_3)_2SiO$, $C_6H_5SiO_{1.5}$, $(CH_3)_3SiO_{0.5}$, $(CH_3)(C_6H_5)SiO$, $CH_3SiH_2O_{0.5}$, $CH_3SiHO$, $C_6H_5SiHO$, etc.

While any of the silicon-hydrogen compounds described above are operative in the practice of the present invention, it is preferred that the silicon-hydrogen compound be an organopolysiloxane such as an organocyclopolysiloxane having the formula:

(5) $\quad (ZHSiO)_d$ or an organopolysiloxane polymer or copolymer having the formula:

(6) $\quad (Z)_e Si(H)_f O_{\frac{4-e-f}{2}}$ where Z and $d$ are as previously defined, $e$ has a value of from 0.5 to 2.49, $f$ has a value of from 0.001 to 1.0 and the sum of $e$ plus $f$ is equal to from 1.0 to 2.5, inclusive. Organopolysiloxanes within the scope of Formulae 5 and 6 are well known in the art and are prepared, for example, by the hydrolysis and condensation of various organochlorosilanes. Thus, where Z is methyl, cyclopolysiloxanes within the scope of Formula 5 can be prepared by hydrolyzing and condensing methyldichlorosilane. Products within the scope of Formula 6 can be prepared by cohydrolyzing and cocondensing a mixture of two or more chlorosilanes, at least one of which contains a silicon-bonded hydrogen atom. For example, compounds within the scope of Formula 6 can be prepared by the cohydrolysis and cocondensation of one or more members selected from the class consisting of trimethylchlorosilane, dimethylchlorosilane, methyltrichlorosilane or silicon tetrachloride with one or more members selected from the class consisting of methyldichlorosilane, dimethylchlorosilane, trichlorosilane, dichlorosilane, or methylchlorosilane.

The unsaturated compounds containing olefinic or acetylenic unsaturation which can react with the compounds described above containing the silicon-hydrogen linkage includes substantially all of the aliphatically unsaturated compounds known to the art. Thus, the aliphatically unsaturated compound may be a monomeric or polymeric material. The unsaturated compound can contain carbon and hydrogen only, or may also contain any other element. Where the aliphatically unsaturated compound contains an element other than carbon and hydrogen, it is preferred that the other element be oxygen, a halogen, nitrogen or silicon or mixtures of these other elements. The aliphatically unsaturated compound can contain a single pair of carbon atoms linked by multiple bonds or can contain a plurality of pairs of carbon atoms linked by multiple bonds. Among the many unsaturated hydrocarbons applicable to the present invention can be mentioned for purposes of illustration, ethylene, propylene, butylene, octylene, styrene, butadiene, pentadiene, pentene-2, divinylbenzene, vinylacetylene, etc. Preferably, the hydrocarbon is one having no more than 20 to 30 carbon atoms in the chain.

Included among the oxygen-containing unsaturated compounds which can be employed in the practice of the present invention are methylvinyl ether, divinyl ether, phenylvinyl ether, the the monallyl ether of ethylene glycol, allyl aldehyde, methylvinyl ketone, phenylvinyl ketone, acrylic acid, methacrylic acid, methylacrylate, phenylmethacrylate, vinyl acetic acid, vinyl octoate, vinyl acetate, oleic acid, lonoleic acid, etc. Unsaturated compounds applicable in the process of the present invention also include acyclic and heterocyclic materials containing aliphatic unsaturation in the ring. Included within this class of compounds are, for example, cyclohexene, cycloheptene, dihydrofuran, dihydropyrene, etc.

In addition to compounds containing carbon, hydrogen and oxygen, compounds containing other elements can also be employed. Thus, halogenated derivatives of any of the materials described above can be employed including the acyl chlorides as well as compounds containing a halogen substituent on a carbon atom other than a carbonyl carbon atom. Thus, applicable halogen-containing materials include, for example, vinyl chloride, the vinyl chlorophenyl ethers, the allyl ester of trichloroacetic acid, etc.

Other types of unsaturated materials useful in the practice of the present invention include unsaturated materials containing nitrogen substituents such as acrylonitrile, allyl cyanide, nitroethylene, etc.

The unsaturated compounds useful in the practice of the present invention also include polymeric materials containing aliphatic unsaturation such as the polyester resins prepared from polybasic saturated or unsaturated acids with polyhydric unsaturated alcohols, and the polyester resins prepared by reacting unsaturated polybasic acids with saturated polyhydric alcohols. Thus, a suitable polyester is one prepared by condensing maleic acid with ethylene glycol.

One of the particularly useful types of unsaturated compound which can be employed in the practice of the present invention are those compounds containing silicon, such as the materials commonly referred to as organosilicon monomers or polymers. The scope of the organosilicon compounds which are applicable to the process of the present invention is identical to the scope of the silicon-hydrogen compounds useful in the practice of the present invention. The unsaturated organosilicon compounds are identical to the silicon-hydrogen compounds except that the silicon-bonded hydrogen atom is substituted with a silicon-bonded organic radical containing at least one pair of aliphatic carbon atoms linked with multiple bonds. Preferably, these organosilicon compounds are free of silicon-bonded hydrogen atoms, but it is also possible to employ organosilicon compounds containing both silicon-bonded hydrogens and silicon-bonded radicals containing silicon-bonded aliphatically unsaturated radicals. The only requirement of these unsaturated organosilicon compounds is that there be at least one aliphatically unsaturated organic radical attached to silicon per molecule. Thus, the aliphatically unsaturated organosilicon compounds include silanes, polysilanes, siloxanes, silazanes, as well as monomeric or polymeric materials containing silicon atoms joined together by methylene or polymethylene groups or by phenylene groups.

Of the broad class of aliphatically unsaturated organosilicon compounds which can be employed in the practice of the present invention, there are three groups of such compounds which are preferred. One of these groups is the monomeric silanes having the formula:

(7) $(Y)_m(Y')_n Si(X)_{4-m-n}$ where X is as previously defined, Y is a monovalent hydrocarbon radical of the scope previously defined for Z, Y' is an organic radical containing at least one pair of aliphatic carbon atoms attached by multiple bonds, $m$ is equal to from 0 to 3, inclusive, $n$ is equal to from 1 to 4, inclusive, and the sum of $m$ plus $n$ is equal to from 1 to 4, inclusive.

A second class of preferred unsaturated organosilicon compounds are those cyclopolysiloxanes having the formula:

(8) $(YY'SiO)_d$ where Y and Y' and $d$ are as previously defined. The third group of unsaturated organic silicon compounds preferred in the practice of the present invention are those having the formula:

(9) $(Y)_e(Y')_f SiO_{\frac{4-e-f}{2}}$ where Y, Y', $e$ and $f$ are as previously defined.

All of the organic silicon compounds within the scope of Formulae 7, 8 and 9 are well known in the art and are prepared by conventional methods. Included among the organic silicon compounds within the scope of Formulae 7, 8 and 9 are the preferred types of material in which Y is methyl or a mixture of methyl and phenyl and in which Y' is an alkenyl radical, preferably vinyl or allyl.

Within the scope of Formula 7 are silanes such as methvinyldichlorosilane, vinyltrichlorosilane, allyltrichlorosilane, methylphenylvinylchlorosilane, phenylvinyldichlorosilane, diallyldichlorosilane, vinyl-beta-cyanoethyldichlorosilane, etc. Included among the cyclic products within the scope of Formula 8 are, for example, the cyclic trimer of methylvinylsiloxane, the cyclic pentamer of methylvinylsiloxane, the cyclic tetramer of methylvinylsiloxane, the cyclic tetramer of vinylphenylsiloxane, etc.

Included within the scope of Formula 9 are the broad class of well known organopolysiloxanes which can be resinous materials, low viscosity fluids, or high molecular weight gummy materials. These polymeric materials are prepared by the well known method of hydrolysis and condensation of a particular diorganodichlorosilane or by the cohydrolysis and cocondensation of a mixture of several different diorganodichlorosilanes. Thus products within the scope of Formula 9 can be prepared by the hydrolysis and condensation of vinyltrichlorosilane alone, divinyldichlorosilane alone, methylvinyldichlorosilane alone, phenylvinyldichlorosilane alone, or by the cohydrolysis and cocondensation of any of the aforementioned vinyl-containing chlorosilanes with one or more monoorganotrichlorosilanes, diorganodichlorosilane, triorganochlorosilanes, or silicon tetrachloride. While the hydrolysis and cohydrolysis above have been described in connection with vinyl-containing organosilicon compounds it should be understood that in place of the vinyl group can be any silicon-bonded organic radical containing at least one pair of aliphatic carbon atoms linked by multiple bonds.

To effect reaction between the silicon-hydrogen containing reactant and the reactant containing aliphatic unsaturation, the two reactants are merely mixed in the desired proportions and the desired amount of rhodium compound is added, and the reaction mixture is maintained at the desired reaction temperature for a time sufficient to effect the addition of the silicon-hydrogen bond across the multiple bonds of the aliphatically unsaturated compound. The relative amounts of the silicon-hydrogen containing compound and the compound containing multiple bonds can vary within extremely wide limits. In theory, one silicon-hydrogen bond is equivalent to one olefinic double bond or one-half acetylenic triple bond so that this equivalency establishes the general order of magnitude of the two reactants employed. However, for many purposes it may be desirable to employ an excess of one of the reactants to facilitate the completion of the reaction or to insure that the reaction product still contains either silicon-hydrogen bonds in the unreacted state, or still contains one or more pairs of carbon atoms linked by multiple bonds. In general, however, the ratios of the reactants are selected so that there are present from about 0.005 to 20 silicon-hydrocarbon linkages available in one reactant per pair of aliphatic carbon atoms linked by double bonds in the other reactant or from about 0.06 to 15 silicon-hydrogen linkages in one reactant per pair of aliphatic carbon atoms linked by triple bonds in the other reactant.

The amount of rhodium compound employed in effecting the addition reaction can vary within extremely wide limits. One of the advantages of the rhodium compound of the present invention is its high activity in low concentration, such as concentrations of the order of 1 mole of rhodium compound (providing one mole of rhodium) per billion moles of unsaturated groups in the organic compound containing at least one pair of aliphatic carbon atoms linked by multiple bonds. While the rhodium-containing compound is operative in such minute amounts the desired addition reaction is generally effected more rapidly with higher concentrations of compound. Thus, concentrations as high as 1 to 10 moles of rhodium compound per thousand moles of unsaturated groups in the unsaturated compound can be employed. Generally the economics of the reaction dictates the particular level of rhodium compound employed. The advantage of using low catalyst concentrations (of the rhodium compound) includes low catalyst cost and the absence of any substantial amount of catalyst as a contaminant in the final product. The advantage of increased catalyst is increased rate of reduction. In general, it has been found that satisfactory rates of reaction are obtained when the rhodium compound is used in an amount sufficient to provide one mole of rhodium per 1,000 moles unsaturated groups to one mole of rhodium per 1,000,000 moles of aliphatically unsaturated groups in the unsaturated organic compound.

Because the rhodium compound is employed in such minute quantities it is often desirable to use the compound as a solution in a diluent to facilitate uniform dispersion of the catalyst in the reactants. Suitable diluents are any material which is a solvent for the catalyst and which is inert to the reactants under the conditions of the reaction. The preferred diluents are hydrocarbon solvents such as aromatic hydrocarbons, including benzene, toluene and axylene. However, aliphatic solvents such as aliphatic mineral spirits can also be employed. In addition to these hydrocarbon solvents the diluent can be an alcohol or ether. Where a diluent is employed, this is used in an amount equal to from 10 to 10,000 parts by weight diluent per part of the catalyst compound of the present invention.

To effect the addition reactions with the rhodium compound, the two reactants and the rhodium compound (either per se or in a diluent) are thoroughly mixed and maintained at the reaction temperature for a time sufficient to effect the reaction. Because of the high activity of the rhodium compound, some degree of reaction often occurs at room temperature as soon as the catalyst is mixed with the reactants. Accordingly, the reaction temperature can be room temperature or even a temperature as low as about 0° C. On the other hand there is no upper limit to the temperature at which the reaction can be run except temperature limitations imposed by the particular reactants and the particular diluent used for the rhodium-containing catalyst. Thus, reaction temperatures on the order of 150 to 200° C. can be employed. Preferably, however, the reaction is effected at temperatures in the range of from about 60 to 130° C. The time required for effecting the addition reaction depends upon a number of factors such as the particular reactants employed and the amount of rhodium compound employed. Thus, reaction times can run from a few minutes up to 12 or more hours depending on reaction conditions.

In some cases, in addition to employing a diluent for the catalyst it is desirable to employ also a solvent for one or both of the reactants. Again the amount of solvent employed in this case is not critical and can vary without limit except for economic considerations. Any solvent can be employed which will dissolve the desired reactant or reactants and which also is inert to the reactants under the conditions of the reaction.

The following examples are illustrative of the practice of our invention and are not intended for purposes of limitation. All parts are by weight.

*Example 1*

About 1 part of the rhodium compound solution prepared by method 2 (supra) was added to about 100 parts of an equimolar mixture of tetramethyl tetravinyl cyclotetrasiloxane $[-Si(CH_3)(CH=CH_2)O-]_4$ and tetramethylcyclotetrasiloxane $[-Si(CH_3)(H)O]_4$. The mixture of ingredients was heated to about 65° C. at which time a rapid polymerization reaction occurred to give a hard solid glass-like coreaction product.

*Example 2*

In this example, 1 part of the rhodium compound solution prepared by method 2 (supra) was added to 100 parts of an equimolar mixture of the above-mentioned cyclic methyl hydrogen polysiloxane shown in Example 1 and diallyl phthalate. The mixture of ingredients was heated to about 70° C. to give a rapid polymerization of the ingredients thereby yielding a solid transparent product.

*Example 3*

When diallyl adipate was substituted for the methyl vinylpolysiloxane of Example 1 and heating carried out at about 70° C., rapid reaction took place to give a solid glass-like, hard polymer.

*Example 4*

About 1 part of the catalyst solution prepared by method 2 was added to 200 parts of a mixture of an equimolar mixture of trichlorosilane and hexene-1 under dry nitrogen and heated at the reflux temperature of the mass for 20 hours. The product was distilled under dry nitrogen to give a liquid boiling at 182° C. which analysis established to be hexyltrichlorosilane.

*Example 5*

In this example, about 1 part of the catalyst solution prepared by method 2 was added to 100 parts of an equimolar mixture of dichlorophenylsilane $(C_6H_5SiHCl_2)$ and hexene-1 under dry nitrogen. The mixture was slowly raised in temperature and finally maintained at 100° C. for 2 hours. The product was fractionally distilled under reduced pressure to give a liquid boiling at 88° C. at 0.1–0.2 mm. Analysis of this composition showed it to be dichlorophenylhexylsilane having the formula $C_6H_{13}SiCl_2C_6H_5$ as evidenced by the analysis which showed the compound to contain 54.77 percent carbon, 6.91 percent hydrogen and 28.5 percent chlorine as contrasted to theoretical values of 55.2 percent carbon, 6.95 percent hydrogen and 27.2 percent chlorine.

*Example 6*

About 1 part of the catalyst solution prepared by method 2 was added to 100 parts of an equimolar mixture of ethyldichlorosilane and hexene-1 under dry nitrogen. The mixture was raised in temperature slowly and maintained at 95° C. for 1.5 hours. The product was fractionally distilled at reduced pressure to give a clear liquid boiling at 81–82° C./7 mm. Analysis of this compound showed it to be ethyldichlorohexylsilane having the formula $C_2H_5SiCl_2C_6H_{13}$ as evidenced by the analysis which showed the compound to contain 44.97 percent carbon, 8.54 percent hydrogen and 29.9 percent chlorine as contrasted to the theoretical values of 45.0 percent carbon, 8.5 percent hydrogen and 33.3 percent chlorine.

*Example 7*

This example illustrates the preparation of a rhodium compound containing an organic carboxylic residue. More particularly, 1.3 parts rhodium trichloride trihydrate was dissolved in 5 parts distilled water. To this solution was added about 5 parts of 3 M sodium heptanoate so that there was present 3 mols of the heptanoate radical

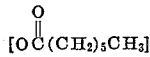
$$[O\overset{O}{\underset{\|}{C}}(CH_2)_5CH_3]$$

per mol of rhodium. The resulting mixture was heated at 60° C. for 5 minutes during which time a percipitate was obtained. The precipitate was filtered, washed several times in water and after drying in vacuo the precipitate was dissolved in ethanol, filtered, and the ethanol solution was evaporated to dryness, again in vacuo. The residue was a waxy solid that gave an infrared spectrum typical of a heavy metal heptanoate. This carboxylate complex of rhodium was soluble in many organic solvents such as $CCl_4$, $CHCl_3$, benezene, ethanol, etc. It was insoluble in saturated aliphatic hydrocarbons and olefins boiling below heptene.

*Example 8*

Employing the rhodium heptanoate compound of Example 7, 0.1 part of the aforesaid rhodium heptanoate was dissolved in 10 parts carbon tetrachloride. About 0.1 part of this carbon tetrachloride solution was added to 10 parts of an equimolar mixture of the methylhydrogencyclopolysiloxane and methylvinylcyclopolysiloxane of Example 1. On warming the mixture to 50° C. a clear, colorless solution was obtained. After 20 minutes of further heating at 50° C., the solution was converted to a clear, glassy polymer.

*Example 9*

Employing the rhodium heptanoate compound of Example 7, 0.1 part of this complex was dissolved in 10 parts benzene and 0.1 part of this benzene solution was added to 10 parts of an equimolar mixture of phenyldichlorosilane and hexene-1. A clear, yellow solution was obtained which on heating to 60° C. reacted rapidly giving complete addition of the silicon hydride to the hexene and resulting in the composition, phenyldichlorohexylsilane.

*Example 10*

In this example, 0.01 part of the rhodium heptanoate compound prepared in Example 7 was added to 5 parts octene-1, and the mixture heated to the boiling point of the mass to give a solution of the compound in octene-1. Thereafter 4 parts ethyldichlorosilane was added to the solution and the mixture heated to 60° C. at which time a rapid, complete addition of the silicon hydride olefin occurred to give ethyldichlorooctylsilane.

*Example 11*

Employing the rhodium compound containing the rhodium-bonded olefin group prepared in accordance with method 1 (supra), about 0.1 part of this rhodium olefin complex was dissolved in 10 parts benezene and 0.1 part of this solution was added to 10 parts of an equimolar mixture of the tetramethyltetravinylcyclotetrasiloxane and tetramethylcyclotetrasiloxane used in Example 1. This mixture was heated for about 20 minutes at 50° C. to give a hard, clear, glassy polymer.

While the foregoing examples have illustrated many of the embodiments of the present invention, it should be understood that the present invention is directed to the use of a broad class of organic rhodium compounds which are prepared by effecting reaction between rhodium chloride with any of the other ingredients (or other analogous materials) previously discussed required to give the soluble rhodium compound. These rhodium compound catalysts can be used as solutions in other organic solvents if so desired.

The rhodium compounds have been illustrated as useful in the addition of various types of silicon-hydrogen compounds to various types of compounds containing a pair of aliphatic carbon atoms linked by mulitple bonds. These multiple bonds can be either olefinic or acetylinic double bonds. While the above examples have illustrated a number of reactants subject to addition by the rhodium compounds, it should be understood that the rhodium compounds are applicable as catalysts to the broad class of addition reactions previously described. The conditions and proportions of ingredients and reactants can also be varied widely without departing from the scope of the invention, keeping in mind the stoichiometric requirements of the addition reaction.

The products prepared by the addition reaction of the present invention have various utilities, depending on the particular product formed. Thus, the products formed from a monomeric silane containing a silicon-bonded hydrogen atom and silicon-bonded hydrolyzable groups and olefinic material such as, for example, the product prepared by adding methyldichlorosilane to cyclohexene may be hydrolyzed and condensed in conventional fashion to form various organopolysiloxanes having utility as insulation, water-repellants, etc. Similarly, the products prepared by reacting an organopolysiloxane containing silicon-bonded hydrogen groups with an organopolysiloxane containing silicon-bonded unsaturated groups can be used in conventional silicone polymer applications. Thus, it is entirely possible to prepare these "addition polymers" in any shape desired in supported or unsupported state. Thus, those materials which are rubbery polymers can be used as gaskets and the like similar to conventional silicone rubbers. Those materials which are resinous in nature can be formed as insulation on insulated electrical conductors and the conductors can be used for conventional applications. The monomeric materials prepared by the addition reaction of the present invention are obviously valuable as intermediates in the preparation of more complicated products.

What we claim as new and desired to secure by Letters Patent of the United States is:

1. A process for the production of organosilicon compositions containing carbon-silicon bonds which comprises contacting (a) a silicon compound containing at least one hydrogen atom attached to silicon per molecule with (b) a compound containing aliphatic carbon atoms linked by multiple bonds in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) 
$$H_aRh_bOlefin_cCl_d$$

and (b) 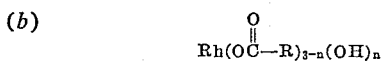
$$Rh(O\overset{O}{\underset{\|}{C}}-R)_{3-n}(OH)_n$$

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

2. A process for the production of organosilicon compositions containing carbon-silicon bonds which comprises contacting (a) a silicon compound containing at least one hydrogen atom attached to silicon per molecule with (b) a compound containing aliphatic carbon atoms linked by multiple bonds in the presence of an organic rhodium compound soluble in at least one of the reactants of (a) and (b) in which an olefinic hydrocarbon is attached to the rhodium, the said compound having been obtained by reaction of rhodium trichloride and an olefin.

3. A process for the production of organosilicon compositions containing carbon-silicon bonds which comprises contacting (a) a silicon compound containing at least one hydrogen atom attached to silicon per molecule with (b) a compound containing aliphatic carbon atoms linked by multiple bonds in the presence of a compound soluble in at least one of the reactants of (a) and (b) and having the formula $$H_aRh_bOlefin_cCl_d$$

where $a$ is a whole number from 0 to 1, inclusive, $b$ is a whole number from 1 to 2, inclusive, $c$ is a whole number from 1 to 4, inclusive, and $d$ is a whole number from 2 to 4, inclusive, and the word "olefin" stands for an aliphatic unsaturated hydrocarbon.

4. A process for the production of organosilicon compositions containing carbon-silicon bonds which comprises contacting (a) a silicon compound containing at least one hydrogen atom attached to silicon per molecule with (b) a compound containing aliphatic carbon atoms linked by multiple bonds in the presence of an organic rhodium compound soluble in at least one of the reactants of (a) and (b) and having the formula $$\underset{}{Rh(O\overset{O}{\overset{\|}{C}}R)_{3-n}(OH)_n}$$

where R is a monovalent hydrocarbon, and $n$ is a value from 0 to 1, inclusive.

5. A process for the production of organosilicon compositions containing carbon-silicon bonds which comprises contacting (a) an organosilicon compound having the formula $$(Z)_aSi(H)_bX_{(4-a-b)}$$

where X is selected from the class consisting of halogen, alkoxy radicals, aryloxy radicals, and acyloxy radicals, Z is selected from the class consisting of monovalent hydrocarbon radicals, halogenated monovalent hydrocarbon radicals, and cyanoalkyl radicals, $a$ has a value from 0 to 3, inclusive, $b$ has a value from 1 to 2, inclusive, and the sum of $a+b$ is from 1 to 4, inclusive, with (b) a compound containing aliphatic carbon atoms linked by multiple bonds in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\qquad H_aRh_bOlefin_cCl_d$ and (b)

$$\underset{}{Rh(O\overset{O}{\overset{\|}{C}}{-}R)_{3-n}(OH)_n}$$

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

6. The process for the production of organosilicon compositions containing carbon-silicon bonds which comprises contacting (a) an organosilicon compound having the formula $$(Z)_eSi(H)_fO_{\frac{4-e-f}{2}}$$

where Z is selected from the class consisting of monovalent hydrocarbon radicals, halogenated monovalent hydrocarbon radicals, and cyanoalkyl radicals, $e$ has a value from 0.5 to 2.49, inclusive, $f$ has a value from 0.001 to 1.0, inclusive, and the sum of $e+f$ is equal to from 1.0 to 2.5, inclusive, with (b) a compound containing aliphatic carbon atoms linked by multiple bonds in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\qquad H_aRh_bOlefin_cCl_d$ and (b)

$$\underset{}{Rh(O\overset{O}{\overset{\|}{C}}{-}R)_{3-n}(OH)_n}$$

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

7. A process for the production of a polymeric organopolysiloxane containing carbon-silicon bonds which comprises contacting (a) an organopolysiloxane having the formula $$(Y)_e(Y')_fSiO_{\frac{4-e-f}{2}}$$

with (b) a compound having the formula $$(Z)_eSi(H)_fO_{\frac{4-e-f}{2}}$$

where Z and Y are selected from the class consisting of monovalent hydrocarbon radicals, halogenated monovalent hydrocarbon radicals, and cyanoalkyl radicals, Y′ is an organic radical containing aliphatic carbon atoms linked by multiple bonds, $e$ has a value from 0.5 to 2.49, inclusive, $f$ has a value from 0.001 to 1.0, inclusive, and the sum of $e+f$ is equal to from 1.0 to 2.5, inclusive, in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\qquad H_aRh_bOlefin_cCl_d$ and (b)

$$\underset{}{Rh(O\overset{O}{\overset{\|}{C}}RR_{(3-n)}(OH)_n}$$

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

8. The process for the production of organosilicon compositions containing carbon-silicon bonds which comprises contacting in the presence of an organic rhodium compound soluble in at least one of the following reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\quad H_aRh_bOlefin_cCl_d$ and (b)
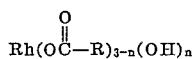

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon, a mixture of ingredients comprising (a) an organosilicon composition containing a silicon-bonded vinyl group and (b) another organosilicon compound free of silicon-bonded vinyl groups and containing silicon-bonded hydrogen.

9. A process for producing polymeric polysiloxanes containing carbon-silicon bonds which comprises contacting (a) tetramethyltetravinylcyclotetrasiloxane with (b) tetramethylcyclotetrasiloxane in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\quad H_aRh_bOlefin_cCl_d$ and (b)
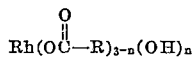

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

10. The process for forming organosilicon compositions containing silicon-carbon bonds which comprises contacting (a) an olefinic hydrocarbon with (b) trichlorosilane in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\quad H_aRh_bOlefin_cCl_d$ and (b)
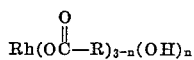

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

11. The process for producing an organosilicon composition containing silicon-carbon bonds which comprises contacting (a) diallyl phthalate with (b) a methyl hydrogen polysiloxane in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\quad H_aRh_bOlefin_cCl_d$ and (b)
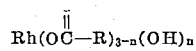

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

12. The process for obtaining organosilicon compositions containing carbon-silicon bonds which comprises contacting (a) an organochlorosilane containing silicon-bonded hydrogen with (b) an olefinic hydrocarbon in the presence of an organic rhodium compound soluble in at least one of the reactants of (a) and (b), and selected from the class consisting of (1) rhodium compounds obtained by the addition of the reaction product of rhodium trichloride and an aliphatic alcohol free of tertiary carbon to a silane of the formula $R_3SiH$, and (2) those organic rhodium compounds having the formulas (a) $\quad H_aRh_bOlefin_cCl_d$ and (b)
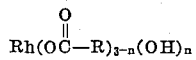

where R is a monovalent hydrocarbon radical, $a$ is a whole number from 0 to 1, inclusive, $b$ is a whole number from 1 to 2, inclusive, $c$ is a whole number from 1 to 4, inclusive, $d$ is a whole number from 2 to 4, inclusive, $n$ is a value from 0 to 1, inclusive, and the word "olefin" represents an unsaturated aliphatic hydrocarbon.

13. The process as in claim 8 in which the organic rhodium compound is an olefinic rhodium compound of the formula $$H_aRh_bOlefin_cCl_d$$

where $a$ is a whole number from 0 to 1, inclusive, $b$ is a whole number from 1 to 2, inclusive, $c$ is a whole number from 1 to 4, inclusive, $d$ is a whole number from 2 to 4, inclusive, and the word "olefin" represents an aliphatic unsaturated hydrocarbon.

14. The process as in claim 8 in which the organic rhodium compound is an organocarboxylate of rhodium having the formula

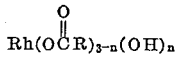

where R is a monovalent hydrocarbon radical and $n$ is a value from 0 to 1, inclusive.

References Cited by the Examiner

UNITED STATES PATENTS

| | | | |
|---|---|---|---|
| 2,274,058 | 2/1942 | Goebel et al. | 260—429 |
| 2,397,732 | 4/1946 | Gaver et al. | 260—209 |
| 2,721,873 | 10/1955 | Mackenzie et al. | 260—448.2 |

(Other references on following page)

UNITED STATES PATENTS

| | | | |
|---|---|---|---|
| 2,823,218 | 2/1958 | Speier et al. | 260—448.2 |
| 2,912,449 | 11/1959 | Sweeney | 260—439 |
| 2,915,497 | 12/1959 | Clark | 260—448.2 |
| 2,953,586 | 9/1960 | Hafner et al. | 260—429 |
| 2,970,150 | 1/1961 | Bailey | 260—448.2 |
| 3,040,090 | 6/1962 | Alderson et al. | 260—483 |
| 3,051,748 | 8/1962 | DePree et al. | 260—526 |

OTHER REFERENCES

Pascal, "Nouveau Traité de Chimie Minerale," Masson et Cie, Paris, publishers, 1958, vol. 19, pages 344–8, 427–34 and 439–61.

HELEN M. McCARTHY, *Acting Primary Examiner.*

SAMUEL H. BLECH, *Examiner.*

J. G. LEVITT, *Assistant Examiner.*